United States Patent
Sarrio et al.

(10) Patent No.: US 12,113,405 B2
(45) Date of Patent: Oct. 8, 2024

(54) METHOD FOR DRIVING A SINGLE-PHASE ELECTRIC MOTOR AND SINGLE-PHASE ELECTRIC MOTOR

(71) Applicant: PIERBURG PUMP TECHNOLOGY GMBH, Neuss (DE)

(72) Inventors: Oliver Sarrio, Cologne (DE); Felix Wuebbels, Duesseldorf (DE); Miso Boskovski, Meerbusch (DE)

(73) Assignee: PIERBURG PUMP TECHNOLOGY GMBH, Neuss (DE)

(*) Notice: Subject to any disclaimer, the term of this patent is extended or adjusted under 35 U.S.C. 154(b) by 205 days.

(21) Appl. No.: 17/777,624

(22) PCT Filed: Nov. 29, 2019

(86) PCT No.: PCT/EP2019/083178
§ 371 (c)(1),
(2) Date: May 18, 2022

(87) PCT Pub. No.: WO2021/104654
PCT Pub. Date: Jun. 3, 2021

(65) Prior Publication Data
US 2022/0416627 A1 Dec. 29, 2022

(51) Int. Cl.
| H02K 11/33 | (2016.01) |
| H02K 1/12 | (2006.01) |
| H02K 1/22 | (2006.01) |
| H02K 11/27 | (2016.01) |

(52) U.S. Cl.
CPC ............ *H02K 11/33* (2016.01); *H02K 1/12* (2013.01); *H02K 1/22* (2013.01); *H02K 11/27* (2016.01)

(58) Field of Classification Search
CPC . H02K 11/33; H02K 1/12; H02K 1/22; H02K 11/27; H02P 2205/01; H02P 1/465
See application file for complete search history.

(56) References Cited

U.S. PATENT DOCUMENTS

2018/0316297 A1 11/2018 Uemura et al.

FOREIGN PATENT DOCUMENTS

JP 2005-176543 A 6/2005

OTHER PUBLICATIONS

English translation of JP-2005-176543-A (Year: 2005).*

* cited by examiner

*Primary Examiner* — Tulsidas C Patel
*Assistant Examiner* — Joshua Kiel M Rodriguez
(74) *Attorney, Agent, or Firm* — Norman B. Thot

(57) ABSTRACT

A method for driving a single-phase electric motor includes switching drive electronics to a first on-state during a first on-time interval of a pulse width modulation period, switching the drive electronics to a second on-state during a second on-time interval of the pulse width modulation period, switching the drive electronics to an off-state between the first and second on-time intervals, and measuring the phase current with a current sensor. The first and the second on-time interval of one pulse width modulation period are provided with different interval lengths if a defined effective duty cycle is lower than a first duty cycle threshold value so that one of the first and the second on-time interval has an interval length which is equal to or larger than a defined minimum on-time interval length. The phase current is measured during the first and/or second on-time interval with the defined minimum on-time interval length.

6 Claims, 3 Drawing Sheets

METHOD FOR DRIVING A SINGLE-PHASE ELECTRIC MOTOR AND SINGLE-PHASE ELECTRIC MOTOR

CROSS REFERENCE TO PRIOR APPLICATIONS

This application is a U.S. National Phase application under 35 U.S.C. § 371 of International Application No. PCT/EP2019/083178, filed on Nov. 29, 2019. The International Application was published in English on Jun. 3, 2021 as WO 2021/104654 A1 under PCT Article 21(2).

FIELD

The present invention is directed to a method for driving a single-phase electric motor, in particular for driving a sensorless single-phase electric motor, and to a single-phase electric motor, in particular to a sensorless single-phase electric motor.

BACKGROUND

Single-phase electric motors are typically provided with a permanent-magnetic motor rotor which is driven by energizing a stator coil of a motor stator with an alternating drive energy, wherein the drive energy is commutated, i.e., the polarity of the drive energy is alternated, as a function of the present rotational position of the motor rotor. In particular in sensorless electric motors, i.e., electric motors which do not comprise any rotor position sensor, the drive energy can be commutated as a function of a phase current generated in a stator coil by the drive energy.

Electric motors are typically driven with a pulse-width-modulated (pwm) drive energy signal, meaning that drive energy is periodically switched on and off during a defined pulse width modulation (PWM) period. The effective drive energy level is in this case not defined by varying a drive energy amplitude, but is defined by a pulse width modulation (PWM) duty cycle, i.e., the effective on-time during one PWM period.

Since the phase current in single-phase electric motors normally shows pronounced transient effects with a relatively long settling time as a response to a switching of the drive energy, a reliable phase current measurement is not possible or is at least challenging for conventional motor driving methods based on a pwm drive energy signal. The phase current measurement is particularly challenging during a starting phase when the stator coil is energized with a drive energy signal with a relatively low duty cycle, meaning that the stator coil is energized only for a relatively short time during each PWM period.

SUMMARY

An aspect of the present invention is to provide a reliable starting and driving of a single-phase electric motor, in particular of a sensorless single-phase electric motor, with a pwm drive energy signal.

In an embodiment, the present invention provides a method for driving a single-phase electric motor. The single phase electric motor includes a static motor stator comprising a stator coil, a rotatable motor rotor, a switchable drive electronics which is electrically connected to the stator coil and which is configured to energize the stator coil with a pulse-width-modulated drive energy signal, for driving the rotatable motor rotor, the drive energy signal having a defined effective duty cycle, a control electronics which is configured to switch the switchable drive electronics so as to generate the pulse-width-modulated drive energy signal, and a current sensor which is configured to measure a phase current flowing through the stator coil. The method includes switching the switchable drive electronics to a first on-state during a first on-time interval of a pulse width modulation period of the pulse-width-modulated drive energy signal, switching the switchable drive electronics to a second on-state during a second on-time interval of the pulse width modulation period, switching the switchable drive electronics to an off-state between the first on-time interval and the second on-time interval, and measuring the phase current with the current sensor. The first on-time interval and the second on-time interval of one pulse width modulation period are provided with different interval lengths if the defined effective duty cycle is lower than a first duty cycle threshold value so as to provide that at least one of the first on-time interval and the second on-time interval is provided with an interval length which is equal to or larger than a defined minimum on-time interval length. The phase current is measured during the at least one of the first on-time interval and the second on-time interval which is provided with the defined minimum on-time interval length.

BRIEF DESCRIPTION OF THE DRAWINGS

The present invention is described in greater detail below on the basis of embodiments and of the drawings in which.

DETAILED DESCRIPTION

Figure 1:
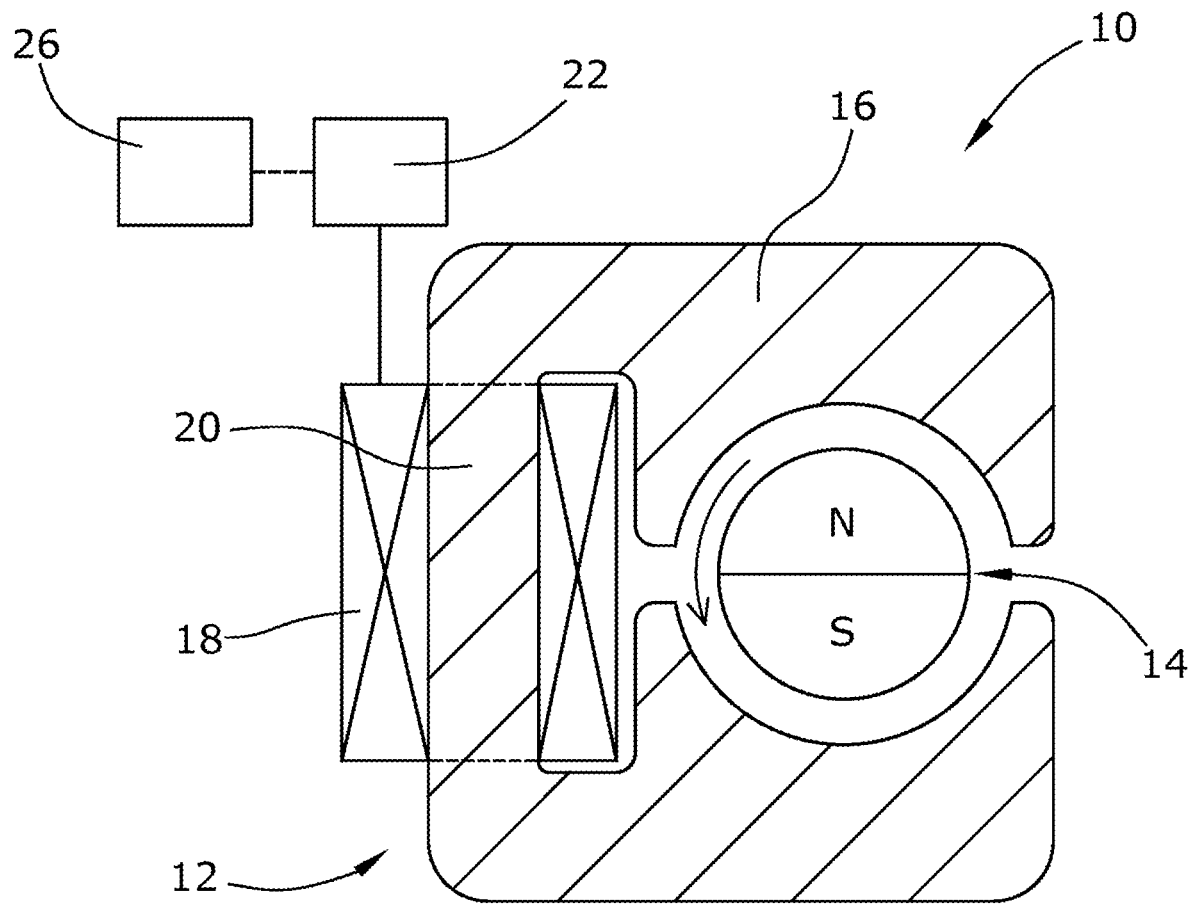
FIG. 1 shows a schematic illustration of single-phase electric motor according to the present invention.

The single-phase electric motor according to the present invention is provided with a static motor stator with a stator coil. The motor stator can, for example, comprise a substantially U-shaped ferromagnetic stator body defining two opposite magnetic poles. The single-phase electric motor is typically provided with a single stator coil which is located opposite to the open end of the U-shaped stator body. The motor stator can, for example, be provided with a laminated stator body, i.e., the stator body is made of a stack of ferromagnetic metal sheets.

The single-phase electric motor according to the present invention is also provided with a rotatable motor rotor. The motor rotor is typically a permanent-magnetic motor rotor. The motor rotor can be either a monolithic rotor body which is permanently magnetized or, alternatively, can be a ferromagnetic rotor body with at least one attached permanent magnet. The motor rotor of the single-phase electric motor is typically provided with exactly two opposite magnetic poles.

The single-phase electric motor according to the present invention is also provided with a switchable drive electronics which is electrically connected to the stator coil for energizing the stator coil. The drive electronics is designed to energize the stator coil with a pwm drive energy signal with a defined effective duty cycle. The drive electronics typically comprises several semiconductor switches, for example, four semiconductor switches, for selectively electrically connecting the stator coil to a defined supply energy or electrically separating the stator coil from the supply energy for generating the pwm drive energy signal. A PWM duty cycle is generally defined as the total on-time during a PWM period. The effective duty cycle in the present context therefore defines the effective time share of the drive energy signal PWM period during which the stator coil is energized with the supply energy and, as a result, defines an effective drive energy level.

The drive electronics is also designed to commutate the effective drive energy provided to the stator coil, i.e., to alternate the effective electric polarity of the drive energy. The electric polarity of drive energy is in particular alternated by selectively electrically connecting either a first end or an opposite second end of the stator coil to a supply voltage terminal, wherein the respective other end of the stator coils is electrically connected to a ground terminal at the same time.

The single-phase electric motor according to the present invention is also provided with a control electronics for switching the drive electronics for generating the pwm drive energy signal. The control electronics is in particular electrically connected to the semiconductor switches of the drive electronics and selectively switches the semiconductor switches for generating the pwm drive energy signal with the defined effective duty cycle and for commutating the drive energy as needed. The drive electronics is typically switched based on a periodical, for example, a triangular-shaped, trigger signal, wherein the typically constant and unchanged period of the trigger signal defines the PWM period. The semiconductor switches are in particular typically switched on/off each time the trigger signal reaches defined on/off threshold values, wherein the threshold values and, as a result, the switching moments, are controlled by the control electronics to provide the defined effective duty cycle and a defined effective electric polarity of the pwm drive energy signal. The control electronics typically comprises a microcontroller.

The single-phase electric motor according to the present invention is also provided with a current sensor for measuring a phase current which flows through the stator coil when the stator coil is energized with the supply energy. The current sensor can, for example, comprise a simple sense resistor which is electrically connected in series with the stator coil and which comprises an arrangement for measuring the voltage drop at the sense resistor. The current sensor can, however, be any means that allows the measuring of the present electrical current flowing through the stator coil.

The method for driving a single-phase electric motor according to the present invention comprises switching the drive electronics to a first on-state during a first on-time interval of a PWM period of a drive energy signal. The semiconductor switches of the drive electronics are in particular switched so that the stator coil is energized with the supply energy during the first on-time interval.

The method for driving a single-phase electric motor according to the present invention also comprises switching the drive electronics to a second on-state during a second on-time interval of the same PWM period. The semiconductor switches of the drive electronics are in particular switched so that the stator coil is energized with the supply energy during the second on-time interval.

The method for driving a single-phase electric motor according to the present invention also comprises switching the drive electronics to an off-state between the two on-time intervals. The semiconductor switches of the drive electronics are in particular switched so that the stator coil is electrically separated from the supply energy during the off-state so that the stator coil is not energized during the off-state.

The method for driving a single-phase electric motor according to the present invention also comprises measuring the phase current flowing through the stator coil with the current sensor. The phase current can be measured at one or more defined moments within the first on-time interval or the second on-time interval or, alternatively, can be measured substantially quasi-continuously.

The two on-time intervals of one PWM period are conventionally always provided with the same interval length, wherein the interval length of each on-time interval is half the total on-time specified by the defined effective duty cycle. According to the present invention, the two on-time intervals of one PWM period of the drive energy signal are provided with different interval lengths if the defined effective duty cycle is lower than a first duty cycle threshold value to ensure that at least one of the two on-time intervals is provided with an interval length which is equal to or larger than a defined minimum on-time interval length. The interval length of one on-time interval, either of the first on-time interval or of the second on-time interval, is in particular always provided with the minimum on-time interval length if the total on-time specified by the defined effective duty cycle is shorter than twice the minimum on-time interval length. The other on-time interval is in this case provided so that the total effective on-time during the respective PWM period complies with that specified by the defined effective duty cycle.

According to the present invention, the phase current is measured during that on-time interval with the defined minimum on-time interval length. The minimum on-time interval length is defined so that, at least at the end of the on-time interval, the phase current does not show any transient effects. The actual phase current can as a result be reliably measured within this on-time interval.

The method for driving a single-phase electric motor according to the present invention provides a reliable measurement of the actual phase current independent of the present defined effective duty cycle. The method according to the present invention in particular allows for a reliable measurement of the phase current during a starting phase in which the motor is driven with a drive energy signal with relatively low effective duty cycle values. The method according to the present invention therefore provides a reliable starting and driving of a single-phase electric motor, in particular of a sensorless single-phase electric motor, with a pwm drive energy signal.

In an embodiment of the present invention, a settling time of the phase current can, for example, be determined, wherein the minimum on-time interval length is defined based on the determined settling time. The phase current settling time is that time required for the phase current to reach a substantially constant current value, i.e., that time after which the phase current no longer shows any transient effects. The settling time can be measured once during a calibration of the electric motor, wherein the measured settling time is saved within a data memory of the electric motor, for example, within the control electronics. Alternatively, or in addition, the present phase current settling time can be (continuously) measured during the driving of the electric motor. The minimum on-time interval length is in any case defined to a value which is larger than, or at least equal to, the measured phase current settling time to allow a reliable measurement of the actual phase current at least at the end of the respective on-time interval.

The motor stator of the single-phase electric motor typically shows a relatively slow electromagnetic response to a drive energy commutation, i.e., it takes a relatively long response time after a commutation of the drive energy until the polarization of the stator magnetic field generated by the stator coil inverts. The electromagnetic response time is in particular typically significantly longer compared to a PWM period of the drive energy signal. A very short-timed inversion of the electric polarity of the drive energy during a PWM period therefore does not cause an inversion of the stator field polarization, but causes a weakening of the effective field strength of the stator magnetic field.

In an embodiment of the present invention, the stator coil can, for example, therefore be energized with a first electric polarity during the first on-time interval and can, for example, therefore be energized with an opposite second electric polarity during the second on-time interval, if the defined effective duty cycle is lower than a second duty cycle threshold value. The stator coil is in particular energized with a requested electric polarity during that on-time interval with the minimum on-time interval length, and is provided with the opposite electric polarity during the shorter other on-time interval of the PWM period, if the total on-time specified by the defined effective duty cycle is shorter than the minimum on-time interval length. Due to the relatively long electromagnetic response time of the motor stator, the effective on-time is in this case substantially defined by the difference of the interval length of the two on-time intervals. The interval length of the shorter on-time interval is therefore provided so that the difference between the two on-time intervals substantially complies with the total on-time specified by the defined effective duty cycle. This allows for a reliable phase current measurement even for very low duty cycles and, as a result, provides an efficient and reliable starting of the electric motor.

The present invention also provides a single-phase electric motor as described above, wherein the electric motor is configured to execute a method for driving a single-phase electric motor.

An embodiment of the present invention is described below with reference to the enclosed drawings.

FIG. 1 shows a sensorless single-phase electric motor 10 comprising a static electromagnetic motor stator 12 and a rotatable permanent-magnetic motor rotor 14.

The motor stator 12 comprises a ferromagnetic stator body 16 and a single stator coil 18 which is arranged satellite-like with respect to the motor rotor 14 at a bridge portion 20 of the stator body 16. The stator body 16 is provided substantially U-shaped and is designed as a so-called laminated stator body, i.e., the stator body 16 is made of a stack of ferromagnetic metal sheets.

The electric motor 10 also comprises a switchable drive electronics 22 with four semiconductor switches 24a-24d for energizing the stator coil 18 with a pwm drive energy signal E with a defined PWM period P and a defined effective duty cycle D.

The electric motor 10 also comprises a control electronics 26 for switching the drive electronics 22, in particular for controlling the semiconductor switches 24a-24d of the drive electronics 22, for generating the pwm drive energy signal E for driving the motor rotor 14. The control electronics 26 in particular controls an effective duty cycle D and an effective polarity of the drive energy signal E, wherein the effective drive energy polarity is commutated at least during a motor starting phase based on a measured phase current flowing through the stator coil 18 when the stator coil 18 is energized by the drive electronics 22.

The electric motor 10 also comprises a current sensor 28 for measuring the phase current flowing through the stator coil 18. The current sensor 28 can, for example, comprise a simple sense resistor and an arrangement for measuring the voltage drop at the sense resistor.

Figure 2:
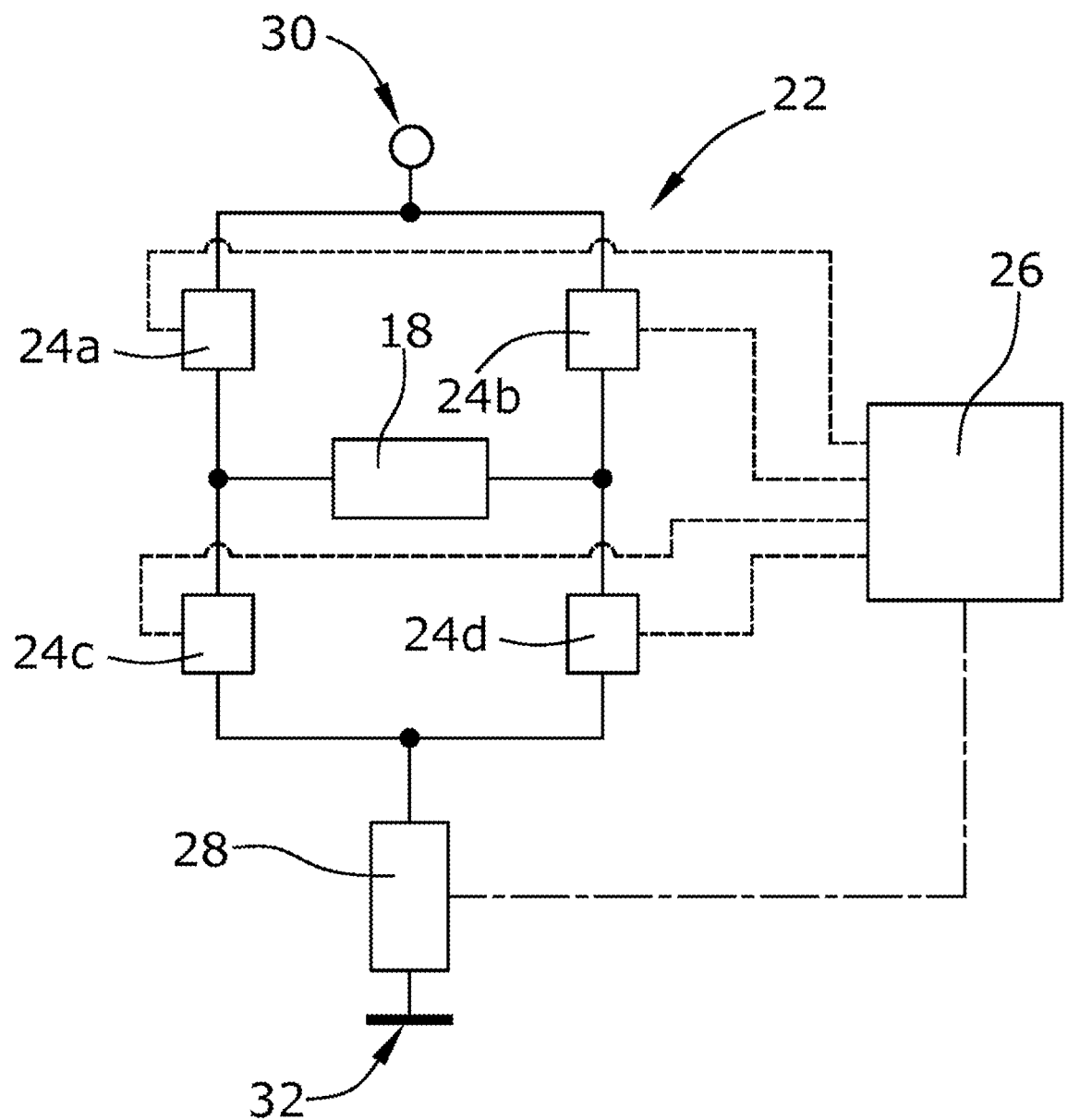
FIG. 2 shows a schematic circuit diagram of a drive electronics of the electric motor of FIG. 1, the drive electronics comprising several semiconductor switches.

FIG. 2 shows a schematic circuit diagram of the drive electronics 22 with the four semiconductor switches 24a-24d. An input terminal of the first semiconductor switch 24a is electrically connected to a supply voltage terminal 30, an output terminal of the first semiconductor switch 24a is electrically connected to a first end of the stator coil 18 and to an input terminal of the third semiconductor switch 24c, and a control terminal of the first semiconductor switch 24a is electrically connected to the control electronics 26.

An input terminal of the second semiconductor switch 24b is electrically connected to the supply voltage terminal 30, an output terminal of the second semiconductor switch 24b is electrically connected to a second end of the stator coil 18 and to an input terminal of the fourth semiconductor switch 24d, and a control terminal of the second semiconductor switch 24b is electrically connected to the control electronics 26.

Output terminals of the third semiconductor switch 24c and of the fourth semiconductor switch 24d are each electrically connected to an input terminal of the current sensor 28, and control terminals of the third semiconductor switch 24c and of the fourth semiconductor switch 24d are each electrically connected to the control electronics 26.

An output terminal of the current sensor 28 is electrically connected to a ground terminal 32, and a sense terminal of the current sensor 28 is (for example, electrically) connected to the control electronics 26 for providing a phase current sense signal to the control electronics 26.

Each semiconductor switch 24a-24d can be switched between an electrically conducting on-state (1) and an electrically non-conducting off-state (0). The third semiconductor switch 24c is always switched substantially inversely to the first semiconductor switch 24a, and the fourth semiconductor switch 24d is always switched substantially inversely to the second semiconductor switch 24b. Only the switching states of the first semiconductor switch 24a and of the second semiconductor switch 24b are therefore subsequently described.

If the first semiconductor switch 24a and the second semiconductor switch 24b are both provided with the same switching state, i.e., both switched to the on-state or both switched to the off-state, the stator coil 18 is not energized.

If the first semiconductor switch 24a is switched to the on-state and the second semiconductor switch 24b is switched to the off-state, the first end of the stator coil 18 is electrically connected to the supply voltage terminal and the second end of the stator coil 18 is electrically connected to the ground terminal 32 via the current sensor 28. The stator coil 18 is as a result energized with a positive-polarity supply energy Es, i.e., a drive energy with a positive electric polarity.

If the first semiconductor switch 24a is switched to the off-state and the second semiconductor switch 24b is switched to the on-state, the second end of the stator coil 18 is electrically connected to the supply voltage terminal and the first end of the stator coil 18 is electrically connected to the ground terminal 32 via the current sensor 28. The stator coil 18 is as a result energized with a negative-polarity supply energy −Es, i.e., a drive energy with a negative electric polarity, meaning that the current flow direction in the stator coil 18 is inversed compared to the positive-polarity supply energy Es.

For generating the pwm drive energy signal E with the defined PWM period P and the defined effective duty cycle D, the semiconductor switches 24a-24d are switched based on a substantially triangular-shaped trigger signal T, wherein the period of the trigger signal T defines the PWM period P. The semiconductor switches 24a,24b are switched to the on-state or to the off-state each time the trigger signal T reaches respective predefined switching threshold values. The first semiconductor switch 24a is switched to the on-state at a first switching moment T1 when the trigger signal T reaches a first switching threshold value. The second semiconductor switch 24b is switched to the on-state at a second switching moment T2 when the trigger signal T reaches a second switching threshold value. The first semiconductor switch 24a is switched to the off-state at a third switching moment T3 when the trigger signal T reaches a third switching threshold value. The second semiconductor switch 24b is switched to the off-state at a fourth switching moment T4 when the trigger signal T reaches a fourth switching threshold value. The first switching threshold value and the second switching threshold value are normally defined at a rising edge of the trigger signal T, whereas the third switching threshold value and the fourth switching threshold value are defined at a falling edge of the trigger signal T.

The drive electronics 22 is switched to a first on-state during a first on-time interval I1 defined by the first switching moment T1 and the second switching moment T2. The drive electronics 22 is switched to a second on-state during a second on-time interval I2 defined by the third switching moment T3 and the fourth switching moment T4. During both on-time intervals I1,I2, a first switching state S1 of the first semiconductor switch 24a is different compared to a second switching state S2 of the second semiconductor switch 24b so that the stator coil 18 is energized with the positive supply energy Es or with the negative supply energy-Es, depending on which semiconductor switch 24a, 24b is in the on-state, respectively.

In between the two on-time intervals I1,I2, the drive electronics 22 is switched to an off-state by switching the first semiconductor switch 24a and the second semiconductor switch 24b to the same switching state (S1=S2, either both on or both off) so that the stator coil 18 is not energized.

The switching moments T1-T4, in particular the respective switching threshold values, are controlled by the control electronics 26 so that the total effective on-time of each PWM period P complies with the specification of the present defined effective duty cycle D, wherein the total effective on-time is defined by interval lengths IL1,IL2 of the on-time intervals I1,I2 and also by a first drive energy electric polarity EP1 during the first on-time interval I1 and by a second drive energy electric polarity EP2 during the second on-time interval I2.

According to the present invention, a phase current settling time Ts is determined by analyzing transient response effects of the phase current caused by a drive energy switching. The phase current settling time Ts can, for example, be determined during a one-time motor calibration procedure. A minimum on-time interval length ILmin is defined to a value being larger than or at least equal to the determined phase current settling time Ts (ILmin>=Ts). Two duty cycle threshold values D1,D2 are furthermore defined based on the minimum interval length ILmin. The first duty cycle threshold value D1 is defined so that the total on-time specified by the first duty cycle threshold value D1 is slightly larger than or equal to twice the minimum on-tome interval length ILmin. The second duty cycle threshold value D2 is defined so that the total on-time specified by the second duty cycle threshold value D2 is slightly larger than or equal to minimum on-time interval length ILmin.

According to the present invention, the control electronics 26 switches the drive electronics 22, in particular the semiconductor switches 24a-24d, based on three different switching patterns, wherein the provided switching pattern depends on the present defined effective duty cycle D. The first switching pattern is provided for defined effective duty cycles D which are higher than or equal to the first duty cycle threshold value D1 (D>=D1). The second switching pattern is provided for defined effective duty cycles D which are lower than the first duty cycle threshold value D1 but higher than or equal to the second duty cycle threshold value D2 (D1>D>=D2). The third switching pattern is provided for defined effective duty cycles D which are lower than the second duty cycle threshold value D2 (D<D2).

Figure 3:
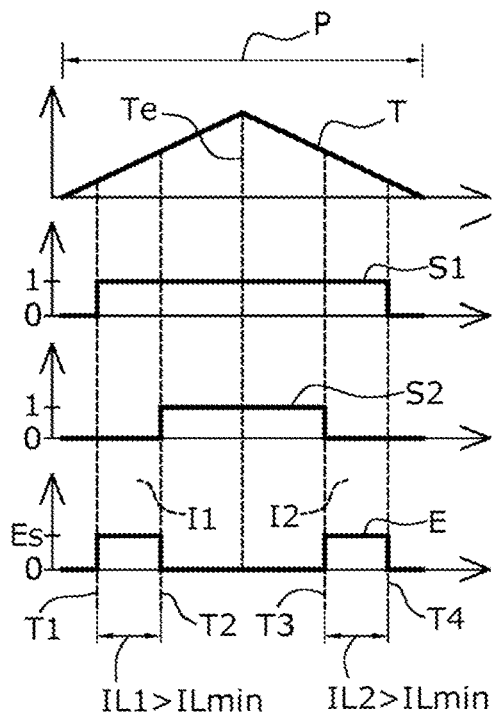
FIG. 3 shows a schematic temporal course of a single PWM period of a trigger signal, of switching states of the semiconductor switches of FIG. 2, and of a generated pwm drive energy signal, for a first switching pattern where defined effective duty cycles Da are higher than or equal to the first duty cycle threshold value D1 (D>=D1)
Figure 4:
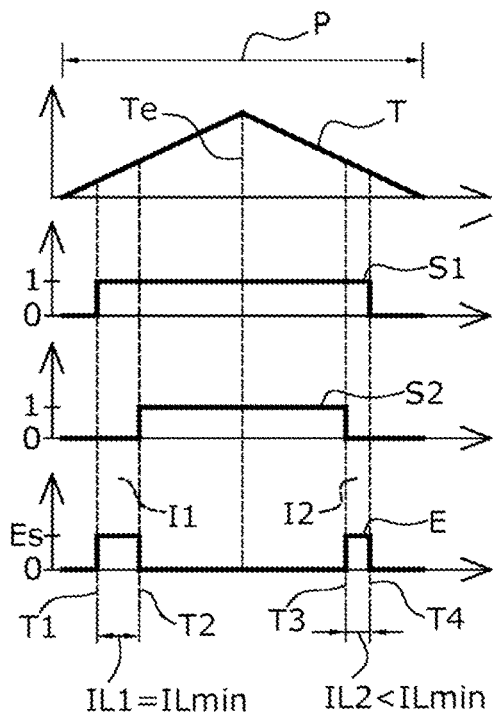
FIG. 4 shows a schematic temporal course of a single PWM period of a trigger signal, of switching states of the semiconductor switches of FIG. 2, and of a generated pwm drive energy signal, for a second switching pattern where defined effective duty cycles Db are lower than the first duty cycle threshold value D1 but higher than or equal to the second duty cycle threshold value D2 (D1>D>=D2)
Figure 5:
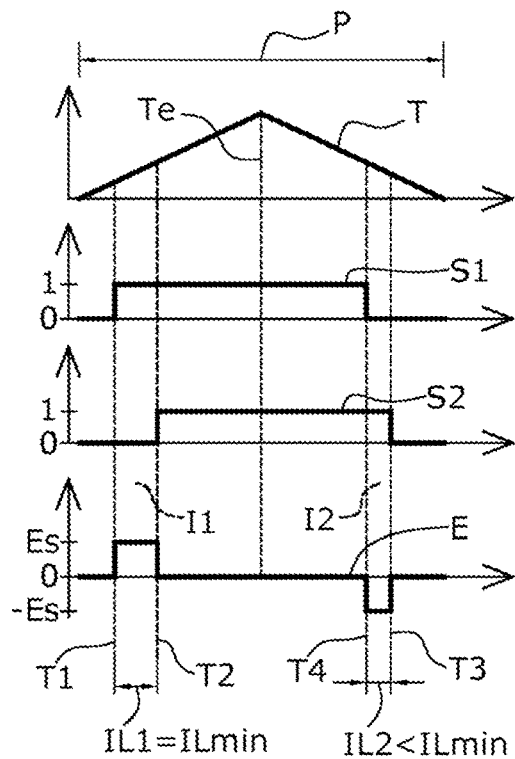
FIG. 5 shows a schematic temporal course of a single PWM period of a trigger signal, of switching states of the semiconductor switches of FIG. 2, and of a generated pwm drive energy signal, for a third switching pattern where defined effective duty cycles Dc are lower than the second duty cycle threshold value D2 (D<D2).

FIGS. 3-5 each show the exemplary temporal courses of the trigger signal T, of the switching states S1,S2, and of the resulting pwm drive energy signal E for one PWM period P for the three different switching patterns, respectively. In all three illustrated examples, the pwm drive energy signal E is provided with a positive total effective electric polarity.

FIG. 3 illustrates the first switching pattern provided for defined effective duty cycles Da being higher than or equal to the first duty cycle threshold value D1 (D>=D1). In this case, both on-time intervals I1,I2 are provided with the same interval length which are equal to half the total on-time specified by the present effective duty cycle D (IL1=IL2=0.5×specified total on-time of D). Both on-time intervals I1,I2 are furthermore provided with the same drive energy polarity (EP1=EP2, here both positive). Since, in this case, the total on-time specified by the present effective duty cycle D is always larger than or equal to twice the minimum intervals length ILmin, the interval lengths IL1,IL2 are always larger than or equal to the minimum on-time interval length ILmin (IL1=IL2>ILmin). In the present embodiment of the present invention, the two on-time intervals I1,I2 are also provided symmetrically with respect to a local extremum Te of the trigger signal T.

FIG. 4 illustrates the second switching pattern provided for defined effective duty cycles Db being lower than the first duty cycle threshold value D1 but higher than or equal to the second duty cycle threshold value D2 (D1 >D>=D2). In this case, as for the first switching pattern, both on-time intervals IL1,IL2 are provided with the same drive energy polarity (EP1=EP2, here both positive). However, since the total on-time specified by the present effective duty cycle D in this case is shorter than twice the minimum on-time interval length ILmin, the two on-time intervals IL1,IL2 are provided with different intervals lengths (IL1 ≠IL2). The first on-time interval I1 is provided with a first interval length IL1 which is equal to the defined minimum on-time interval length ILmin (IL1=ILmin) to allow a reliable phase current measurement during the first on-time interval I1. The second on-time interval I2 is provided with a second interval length IL2 which is equal to the difference between the total on-time specified by the present effective duty cycle D and the first interval length IL1 (IL2=specified total on-time of D−IL1=specified total on-time of D−ILmin) to comply with the specification of the present defined effective duty cycle D.

FIG. 5 illustrates the third switching pattern provided for defined effective duty cycles Dc being lower than the second duty cycle threshold value D2 (D<D2). In this case, as for the second switching pattern, the first on-time interval I1 is provided with the present requested drive energy polarity (here positive) and with a first interval length IL1 which is equal to the defined minimum on-time interval length ILmin (IL1=ILmin) to allow a reliable phase current measurement during the first on-time interval I1. However, since the total on-time specified by the present effective duty cycle D in this case is shorter than the minimum on-time interval length ILmin, the second on-time interval I2 is provided with the inverse drive energy polarity compared to the first on-time interval I1 (EP2≠EP1), i.e., the stator coil 18 is energized with the requested electric polarity (here positive) during the first on-time interval I1 and is energized with the inverse electric polarity (here negative) during the second on-time interval I2 to provide an effective total on-time of the PWM period P being shorter than the minimum on-time interval length ILmin. In this case, the effective total on-time of the PWM period P is substantially defined by the difference between the first interval length IL1 of the first on-time interval I1, which is provided with the present requested drive energy polarity (here EP1=positive), and the second interval length IL2 of the second on-time interval I2, which is provided with the inverse drive energy polarity (here EP2=negative). The second on-time interval I2 is therefore provided with a second interval length IL2 which is equal to the difference between the first interval length IL1 and the total on-time specified by the present effective duty cycle D (IL2=specified total on-time of D−IL1=specified total on-time of D−ILmin) to comply with the specification of the present defined effective duty cycle D.

The switching operations illustrated in FIGS. 3-5 and described above all refer to generating a drive energy signal with a positive requested drive energy polarity. The switching patterns according to the present invention are also applicable, however, for generating a drive energy signal with a negative requested drive energy polarity. The drive energy polarity of each on-time interval described above must in this case be inverted. This is realized in practice by swapping the order of the switching moments T1,T2 and of the switching moments T3,T4 in the described switching operations.

Independent of the applied switching pattern, the phase current is measured by the current sensor 28 at least within the first on-time interval I1 which is always provided with a first interval length IL1 which is larger than or equal to the minimum on-time interval length ILmin. This provides a reliable phase current measurement for each PWM period P of the drive energy signal E independent of the present defined effective duty cycle D and, as a result, independent of the present operating condition of the electric motor 10. This allows a reliable starting and driving of the sensorless single-phase electric motor 10 with the pwm drive energy signal E.

The present invention is not limited to embodiments described herein; reference should be had to the appended claims.

LIST OF REFERENCE SIGNS

10 Electric motor
12 Motor stator
14 Motor rotor
16 Stator body
18 Stator coil
20 Bridge portion
22 Drive electronics
24a First semiconductor switch
24b Second semiconductor switch
24c Third semiconductor switch
24d Fourth semiconductor switch
26 Control electronics
28 Current sensor
30 Supply voltage terminal
32 Ground terminal
D Effective PWM duty cycle
D1 First duty threshold cycle value
D2 Second duty threshold cycle value
E Pwm drive energy signal
EP1 First drive energy electric polarity
EP2 Second drive energy electric polarity
Es,−Es Positive/negative-polarity supply energy
I1 First on-time interval length
I2 Second on-time interval length
IL1 First interval length
IL2 Second interval length
ILmin Minimum on-time interval length
P PWM period
S1 First switching state
S2 Second switching state
T Trigger signal
T1 First switching moment
T2 Second switching moment
T3 Third switching moment
T4 Fourth switching moment
Te Local extremum (of the trigger signal)
Ts Phase current settling time

What is claimed is:

1. A method for driving a single-phase electric motor, the single phase electric motor comprising:
   a static motor stator comprising a stator coil;
   a rotatable motor rotor;
   a switchable drive electronics which is electrically connected to the stator coil and which is configured to energize the stator coil with a pulse-width-modulated drive energy signal, for driving the rotatable motor rotor, the drive energy signal having a defined effective duty cycle;
   a control electronics which is configured to switch the switchable drive electronics so as to generate the pulse-width-modulated drive energy signal; and
   a current sensor which is configured to measure a phase current flowing through the stator coil,
the method comprising:

switching the switchable drive electronics to a first on-state during a first on-time interval of a pulse width modulation period of the pulse-width-modulated drive energy signal;

switching the switchable drive electronics to a second on-state during a second on-time interval of the pulse width modulation period;

switching the switchable drive electronics to an off-state between the first on-time interval and the second on-time interval; and measuring the phase current with the current sensor, wherein, the first on-time interval and the second on-time interval of one pulse width modulation period are provided with a same interval length if the defined effective duty cycle is higher than or equal to a first duty threshold value and are provided with different interval lengths if the defined effective duty cycle is lower than the first duty cycle threshold value so as to provide that at least one of the first on-time interval and the second on-time interval is provided with an interval length which is equal to or larger than a defined minimum on-time interval length, and the phase current is measured during the at least one of the first on-time interval and the second on-time interval which is provided with the defined minimum on-time interval length.

2. The method as recited in claim 1, further comprising: determining a settling time of the phase current, wherein, the defined minimum on-time interval length is defined in dependence on the settling time determined.

3. The method as recited in claim 1, wherein, if the defined effective duty cycle is lower than a second duty cycle threshold value, the method further comprises:

energizing the stator coil with a first electric polarity during the first on-time interval; and energizing the stator coil with a second electric polarity which is opposite to that of the first electric polarity during the second on-time interval.

4. A single-phase electric motor comprising:

a static motor stator comprising a stator coil;

a rotatable motor rotor;

a switchable drive electronics which is electrically connected to the stator coil and which is configured to energize the stator coil with a pulse-width-modulated drive energy signal, for driving the rotatable motor rotor, the drive energy signal having a defined effective duty cycle;

a control electronics which is configured to switch the switchable drive electronics so as to generate the pulse-width-modulated drive energy signal; and a current sensor which is configured to measure a phase current flowing through the stator coil, wherein the single-phase electric motor is configured to perform a method comprising:

switching the switchable drive electronics to a first on-state during a first on-time interval of a pulse width modulation period of the pulse-width-modulated drive energy signal;

switching the switchable drive electronics to a second on-state during a second on-time interval of the pulse width modulation period;

switching the switchable drive electronics to an off-state between the first on-time interval and the second on-time interval; and measuring the phase current with the current sensor, wherein, the first on-time interval and the second on-time interval of one pulse width modulation period are provided with a same interval length if the defined effective duty cycle is higher than or equal to a first duty threshold value and are provided with different interval lengths if the defined effective duty cycle is lower than the first duty cycle threshold value so as to provide that at least one of the first on-time interval and the second on-time interval is provided with an interval length which is equal to or larger than a defined minimum on-time interval length, and the phase current is measured during the at least one of the first on-time interval and the second on-time interval which is provided with the defined minimum on-time interval length.

5. The single-phase electric motor as recited in claim 4, wherein the method further comprises:

determining a settling time of the phase current, wherein, the defined minimum on-time interval length is defined in dependence on the settling time determined.

6. The single-phase electric motor as recited in claim 4, wherein, if the defined effective duty cycle is lower than a second duty cycle threshold value, the method further comprises:

energizing the stator coil with a first electric polarity during the first on-time interval; and energizing the stator coil with a second electric polarity which is opposite to that of the first electric polarity during the second on-time interval.

* * * * *